UNITED STATES PATENT OFFICE.

FREDERIC B. CAMORS, OF NEW ORLEANS, LOUISIANA.

METHOD OF TREATING LIQUIDS AND LIQUID-CONTAINERS.

No. 896,272.        Specification of Letters Patent.        Patented Aug. 18, 1908.

Application filed March 2, 1908. Serial No. 418,856.

*To all whom it may concern:*

Be it known that I, FREDERIC B. CAMORS, citizen of the United States, residing at New Orleans, in the parish of Orleans and State of Louisiana, have invented new and useful Improvements in Methods of Treating Liquids and Liquid-Containers, of which the following is a specification.

My invention relates to the purification of liquids and to the prevention of deposits in and the removal of old deposits from liquid containers, of various descriptions, and the invention relates particularly to the transformation, purification and softening of salt and fresh waters and to the prevention of scales and the removal of old scales in boilers and water containers of various descriptions in which such waters are treated.

One of the objects of the invention is the provision of an economical method by the practice of which matters in suspension in the water being treated are mechanically precipitated and salts are formed which, in general, are non-soluble and non-incrusting.

Other advantageous features of the invention will be fully understood from the following description and claims.

I use in the treatment of water, barium aluminate and sodium aluminate, either singly or in combination; the quantity required being determined by test of the water and the quantity and kind of chemicals to be decomposed.

In the treatment of salt or brackish water (sea and river water) with sodium aluminate the equations are as follows:

Sodium aluminate + magnesia sulfate = magnesia aluminate (insoluble) + sodium sulfate (soluble).

Sodium aluminate + calcium sulfate = calcium aluminate (insoluble) + sodium sulfate (soluble).

Sodium aluminate + magnesia chlorid = magnesia aluminate (insoluble) + sodium chlorid (soluble).

Sodium aluminate + calcium chlorid = calcium aluminate (insoluble in sea water) + sodium chlorid (soluble).

In the treatment of sea or brackish water with barium aluminate, the resulting equation is: Barium aluminate + sodium chlorid = sodium aluminate (soluble) + barium chlorid (soluble). This produces two soluble salts, but it will be noted that the sodium aluminate and the barium chlorid will act as non-incrusting salts and will form with the sulfates a barium sulfate (insoluble) and magnesia + calcium chlorids, which chlorids will reappear sodium chlorids by the action of sodium aluminate, thus:

Barium aluminate + magnesia sulfate = magnesia aluminate (insoluble) + barium sulfate (insoluble).

Barium aluminate + calcium sulfate = calcium aluminate (insoluble) + barium sulfate (insoluble).

Barium aluminate + calcium chlorid = calcium aluminate (insoluble) + barium chlorid (soluble).

Barium aluminate + magnesia chlorid = magnesia aluminate (insoluble) + barium chlorid (soluble).

Barium aluminate + calcium bi-carbonate = barium carbonate (insoluble) + aluminum oxid (insoluble) + calcium carbonate (insoluble) + $H_2O$.

Barium aluminate + magnesia bi-carbonate = magnesia carbonate (insoluble) + barium carbonate (insoluble) + aluminum oxid (insoluble) + $H_2O$.

As will be readily understood from the foregoing a better result is attained by the use of barium aluminate than when sodium aluminate is employed—that is, so far as the subsequent products remaining in solution are concerned, but in this connection it will be manifest that the addition of a small proportion of sodium aluminate can only conduce to good results since the sodium aluminate acts immediately on incrusting salts which should be attacked immediately upon the introduction of the barium aluminate and the sodium aluminate into a water container.

In the treatment of fresh water from various sources of supply I preferably employ barium aluminate and sodium aluminate as an auxiliary thereto. The barium and sodium aluminate act both chemically and mechanically since there is a double decomposition with the salts, and the acids are saturated, and the precipitates formed, whether they contain aluminum or aluminum products carry downward mechanically the major portion of the salts on which no chemical action took place. In this connection it will be noted that sodium aluminate is a powerful auxiliary of barium aluminate when mixed with the latter in suitable proportion to suit the chemical constituents of the water to be treated, and it is particularly advantageous when used for the treatment of water containing chlorids and alkaline sulfates, which are generally present in natural water.

A few of the equations resulting from the use of barium aluminate are as follows, viz:

$$Al_2O_4Ba + CaSO_4 = Al_2O_4Ca + BaSO_4$$
$$Al_2O_4Ba + CO_3H_2 = Al_2O_3 + BaCO_3 + H_2O$$
$$(Al_2O_4Ba)_2 + CaCO_3CO_3H_2 =$$
$$Al_2O_4Ca + 2BaCO_3Al_2O_3 + H_2O.$$

From the foregoing it will be understood that all products of decomposition are insoluble, as is desirable.

The equations following the use of sodium aluminate are as follows, viz:

$$Al_2O_4Na_2 + CaCO_3CO_3H_2 =$$
$$Na_2CO_3 + Al_2O_3 + CaCO_3 + H_2O.$$

The aluminum oxid formed mixes with the calcium carbonate precipitated and prevents agglomeration, while sodium carbonate formed reacts, in turn, on the chlorids and alkaline sufates contained in most natural waters, giving:

$$Na_2CO_3 + CaSO_4 = Na_2SO_4 + CaCO_3$$
$$Na_2CO_3 + CaCl_2 = (NaCl)_2 + CaCO_3$$

It will be gathered from the foregoing that my invention contemplates the use of barium aluminate and sodium aluminate, either singly or in combination and either in solution or powder form, for the purification, transformation and softening of sea and fresh waters and for the prevention of scales in and the removal of scales from boilers and water containers of various descriptions.

For the purpose of removing incrustations from water containers an additional dosing of 20% to 30% is generally necessary, but this additional dosing can be discontinued when the containers are free from incrusting salts.

My novel method is also designed to be used to advantage in preventing the collection of incrustations or other deposits in and removing old incrustations or other deposits from vacuum and cooking pans, single and plural effect pans, and tanks and other sugar-syrup and molasses containers, and in carrying out the same I introduce into syrup to be purified or the container to be cleared of incrustations and other deposits aluminate of barium and preferably aluminate of sodium; the aluminate of sodium serving in many cases as a powerful auxiliary to the aluminate of barium. The aluminate of barium and the aluminate of sodium may be mixed dry or in solution without involving departure from the scope of my invention as claimed, though I prefer to use the said aluminates in solutions since in such state they are more effective for the purpose stated. I also prefer to use the aluminates in the presence of heat especially when quick work is desired, but it is obvious that said ingredients may be used in the cold without departure from the spirit of my invention.

Experience has demonstrated that when employed in suitable doses in sugar syrups, molasses and the like as well as in other vehicles aluminate of barium completely changes the nature of the deposits that may be formed, either by heat or by concentration of the liquids or masses charged with salts, and assures said deposits being of dense pulverulent and non-adhering character and easy of removal.

In general the aluminate of barium will suffice for the removal of the deposits, although the aluminate of sodium is a powerful auxiliary when the sugar syrup, molasses or sugar in the containers contain chlorids and alkaline sulfates.

Having described my invention, what I claim and desire to secure by Letters-Patent, is:

1. The method of purifying liquids and preventing the formation of incrustations in and eliminating incrustations from liquid containers, which consists in the introduction into the liquid of barium aluminate in quantity sufficient to accomplish the purpose desired.

2. The method of purifying liquids and preventing the formation of incrustations in and eliminating incrustations from liquid containers, which consists in the introduction into the liquid of barium aluminate and sodium aluminate in quantities sufficient to accomplish the purpose desired.

In testimony whereof I have hereunto set my hand in presence of two subscribing witnesses.

FREDERIC B. CAMORS.

Witnesses:
ANDREW HERO,
J. S. HERO.